United States Patent
Sun

(10) Patent No.: US 9,934,708 B2
(45) Date of Patent: Apr. 3, 2018

(54) CURVABLE DISPLAY APPARATUS AND CURVABLE DISPLAY DEVICE

(71) Applicant: BOE TECHNOLOGY GROUP CO., LTD., Beijing (CN)

(72) Inventor: Li Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/283,648

(22) Filed: Oct. 3, 2016

(65) Prior Publication Data

US 2017/0105301 A1    Apr. 13, 2017

(30) Foreign Application Priority Data

Oct. 12, 2015 (CN) .......................... 2015 1 0659151

(51) Int. Cl.
G09F 15/00     (2006.01)
G09F 9/30      (2006.01)
H04N 5/64      (2006.01)

(52) U.S. Cl.
CPC .......... *G09F 15/0025* (2013.01); *G09F 9/301* (2013.01); *H04N 5/64* (2013.01)

(58) Field of Classification Search
CPC combination set(s) only.
See application file for complete search history.

(56) References Cited

U.S. PATENT DOCUMENTS 9,081,540 B1     7/2015  Cho et al.
9,119,303 B2 *   8/2015  Baik ..................... H05K 1/028
9,304,539 B2 *   4/2016  Song ..................... G06F 1/1601
9,307,658 B2 *   4/2016  Song ..................... H05K 5/0217
9,310,635 B2 *   4/2016  Yu ....................... G02F 1/133308
9,711,752 B2 *   7/2017  Lee ...................... H01L 51/5237
2013/0114193 A1* 5/2013  Joo ....................... F16M 11/08
                                                          361/679.01

(Continued)

FOREIGN PATENT DOCUMENTS

CN       103093699 A     5/2013
CN       103971608 A     8/2014
(Continued)

OTHER PUBLICATIONS

First Chinese Office Action dated Mar. 23, 2017; Appln. No. 201510659151.2.

(Continued)

*Primary Examiner* — Lisa Lea Edmonds
(74) *Attorney, Agent, or Firm* — Ladas & Parry LLP; Loren K. Thompson

(57) ABSTRACT

A display apparatus and a display device including the display apparatus are disclosed. The display apparatus includes a display panel, an elastic supporting backplate and at least one actuating structure; the display panel is attached to the supporting backplate; the actuating structure is arranged on one side of the supporting backplate away from the display panel and are in contact with the supporting backplate; and the supporting backplate is capable of being driven by the actuating structure, so that bending degrees of the supporting backplate and the display panel can be changed.

13 Claims, 5 Drawing Sheets

(56) References Cited

U.S. PATENT DOCUMENTS

| | | | |
|---|---|---|---|
| 2015/0130775 A1* | 5/2015 | Kim ..................... | G06F 1/1652 |
| | | | 345/205 |
| 2015/0145755 A1* | 5/2015 | Yamazaki ................ | G09G 3/32 |
| | | | 345/76 |
| 2015/0185761 A1 | 7/2015 | Song et al. | |
| 2015/0277854 A1 | 10/2015 | Zhang | |
| 2015/0355675 A1* | 12/2015 | Lv ......................... | G06F 1/1601 |
| | | | 361/679.21 |
| 2016/0066442 A1* | 3/2016 | Kang ................... | H05K 5/0017 |
| | | | 361/807 |
| 2016/0212864 A1* | 7/2016 | Lee ...................... | G06F 1/1652 |

FOREIGN PATENT DOCUMENTS

| | | |
|---|---|---|
| CN | 104407461 A | 3/2015 |
| CN | 204516279 U | 7/2015 |
| CN | 104955285 A | 9/2015 |
| CN | 204991061 U | 1/2016 |

OTHER PUBLICATIONS

The Second Chinese Office Action dated Jul. 13, 2017; Appln. No. 201510659151.2.

\* cited by examiner

CURVABLE DISPLAY APPARATUS AND CURVABLE DISPLAY DEVICE

TECHNICAL FIELD

Embodiments of the present disclosure relate to a display apparatus and a display device.

BACKGROUND

A method for producing a curved display and particularly a large-sized curved display includes directly applying external forces to both ends of a display panel of the display and keeping the display panel in a bending state. However, currently there lacks an apparatus for regulating a bending angle of the display panel.

SUMMARY

An embodiment of the present disclosure provides a display apparatus, comprising a display panel, an elastic supporting backplate and at least one actuating structure; the display panel is attached to the supporting backplate; the actuating structure is arranged on one side of the supporting backplate away from the display panel and are in contact with the supporting backplate; and the supporting backplate is capable of being driven by the actuating structure, so that bending degrees of the supporting backplate and the display panel can be changed.

For example, the actuating structure is an elastic structure, a shape of which is variable, and with elastic change of the shape of the actuating structure, the bending degrees of the supporting backplate and the display panel can be driven to change.

For example, the actuating structure is a strip shape airbag, and an inflation-deflation control unit is arranged on the strip shape airbag.

For example, the strip shape airbag is arranged on an outer surface of the supporting backplate.

For example, a pressure bearing groove is formed inside the supporting backplate, and the strip shape airbag is arranged in the pressure bearing groove.

For example, the actuating structure is a curved strip structure, the actuating structure is movably connected with the supporting backplate, the actuating structure is rotatable with respect to the supporting backplate, and when rotating, the actuating structure has different positions respectively in squeezed contact with the supporting backplate.

For example, the display apparatus further comprises a driving structure, wherein the driving structure is respectively connected with a center of the actuating structure and the supporting backplate, and the driving structure is capable of driving the actuating structure to rotate with respect to the supporting backplate.

For example, the actuating structure is an arc curved bar, and the curved bar is rotatable along an axial direction.

For example, a rotation radius on both ends of the curved bar is greater than a distance from a center of the curved bar to the supporting backplate.

For example, the display apparatus further comprises a buffer member, wherein the buffer member is arranged between the actuating structure and the supporting backplate.

For example, a plurality of actuating structures is arranged.

Another embodiment of the present disclosure provides a display device, comprising any one of the above-described display apparatuses.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, the technical solution and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
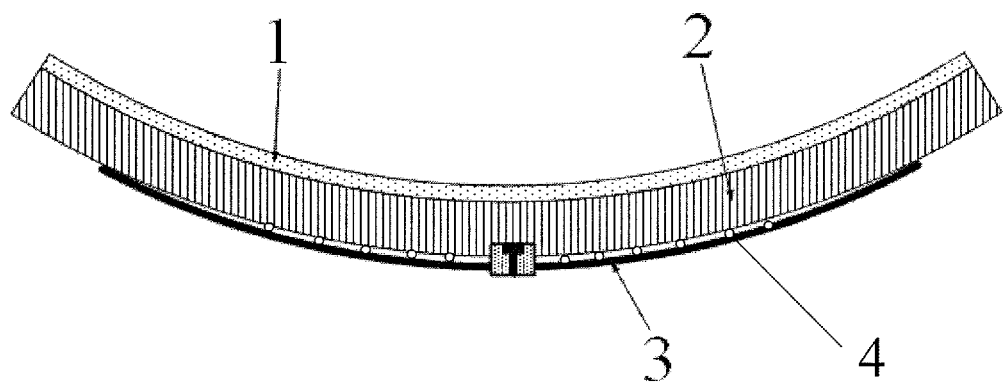
FIG. 1 is a structural schematic diagram of a display apparatus of an embodiment of the present disclosure.

As shown in FIG. 1, an embodiment of the present disclosure provides a display apparatus. The display apparatus includes a display panel 1, an elastic supporting backplate 2 and an actuating structure 3; the display panel 1 is attached to the supporting backplate 2; the actuating structure 3 is arranged on one side of the supporting backplate 2 away from the display panel 1 and is in contact with the supporting backplate 2; and the supporting backplate 2 is driven by the actuating structure 3, so that the bending degree of the supporting backplate 2 as well as the bending degree of the display panel 1 are changed.

For example, the actuating structure 3 has various implementing modes as long as the actuating structure 3 can generate a driving effect on the supporting backplate 2 so as to change the bending the degree of the supporting backplate 2 as well as the bending degree of the display panel 1.

In a comparison example, for a same kind of display panel, supporting backplates with different bending degrees are required for achieving display apparatuses with different curvatures respectively, one supporting backplate of a bending degree is used for a display apparatus of the corresponding bending degree, which is unbeneficial for reducing production cost and is unfavorable for product management. However, for the display apparatus provided by the embodiment of the present disclosure, the supporting backplate is acted by one actuating structure so that the supporting backplate and the display panel can present different bending degrees, thereby enabling the display panel to be a variable curvature display that can have different bending degrees. Moreover, the display apparatus provided by the embodiment of the present disclosure has a simple structure and is low in cost.

As shown in FIG. I, for example, the actuating structure 3 is an elastic structure, of which the shape is variable, and with the elastic change of the shape of the actuating structure, the bending degrees of the supporting backplate and the display panel can be driven to change.

For example, in the embodiment of the present disclosure, the actuating structure 3 adopts the elastic structure, of which the shape is variable, e.g., a spring plate structure. The spring plate structure is connected with the supporting backplate 2, and with the force caused by the elasticity of the spring plate structure, the supporting backplate 2 and the display panel I can reach the required bending degrees. In addition, the actuating structure 3 also can adopt other deformable elastic structures, and with the force caused by the elastic change of the shape of the actuating structure 3, the bending degrees of the supporting backplate 2 and the display panel 1 can be driven to change.

Figure 2:
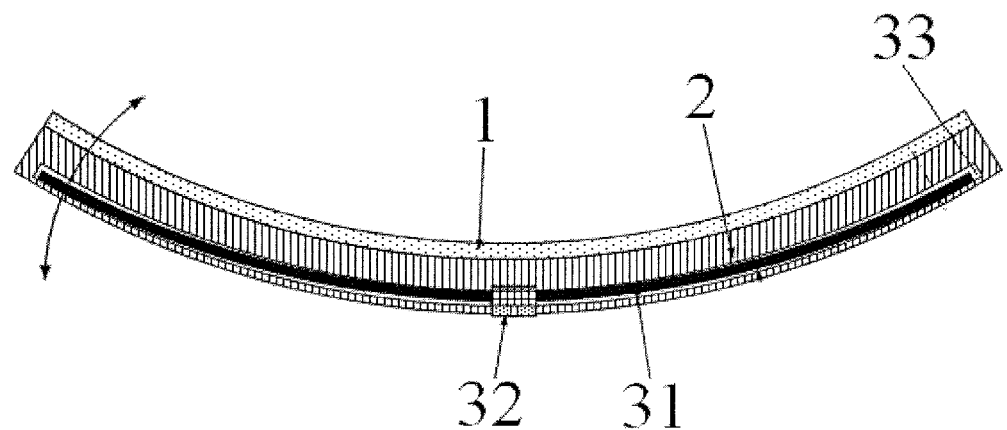
FIG. 2 is another structural schematic diagram of a display apparatus of an embodiment of the present disclosure.

As shown in FIG. 2, for example, the actuating structure 3 is a strip shape airbag 31, and an inflation-deflation control unit 32 is arranged on the strip shape airbag 31. For example, the strip shape airbag 31 is fixed on an outer surface of the supporting backplate 2 and for example in contact with the supporting backplate 2. For example, as shown in FIG. 2, a groove 33 (pressure bearing groove 33) for bearing applied pressure is formed inside the supporting backplate 2, and the strip shape airbag 31 can be arranged in the pressure bearing groove 33.

In the example as shown in FIG. 2, the actuating structure 3 specifically adopts the strip shape airbag 31, the supporting backplate 2 can be bent to a certain curvature in advance, the strip shape airbag 31 is arranged on the outer surface of the supporting backplate 2 or is arranged inside the supporting backplate 2; by inflating and deflating the strip shape airbag 31, an internal pressure of the strip shape airbag 31 is changed and its shape and property can be adjusted; and under different internal pressures, the strip shape airbag 31 is different in straightening trend and is different in squeezing or stretching on the supporting backplate 2 so as to change the bending degree of the supporting backplate 2, enable the supporting backplate 2 and the display panel 1 to present different curvatures and achieve a variable curvature display. In FIG. 2, the pressure bearing groove 33 is formed inside the supporting backplate 2, the strip shape airbag 31 capable of being inflated and deflated is embedded in the pressure bearing groove 33, the embedded strip shape airbag 31 is in a bending state, and then the pressure bearing groove 33 is closed up; the strip shape airbag 31 is different in straightening trend under different internal pressures so as to generate different acting forces on inner walls of the pressure bearing groove 33, the force that the strip shape airbag 31 exerted on the supporting backplate 2 can be changed, and bending conditions of the supporting backplate 2 and the display panel 1 can be changed accordingly, so as to achieve a variable curvature of the display panel. For example, the inflation-deflation control unit can be connected with parts, such as an air pump, a compressor, an electromagnetic valve, a flow meter and the like, which can be flexibly arranged according to practical situations, so as to realize the function of inflating or deflating the airbag 33.

For example, the actuating structure 3 also may be a bag filled with liquid, so long as the bag can be bent and changed to apply a force to the display panel.

Figure 3:
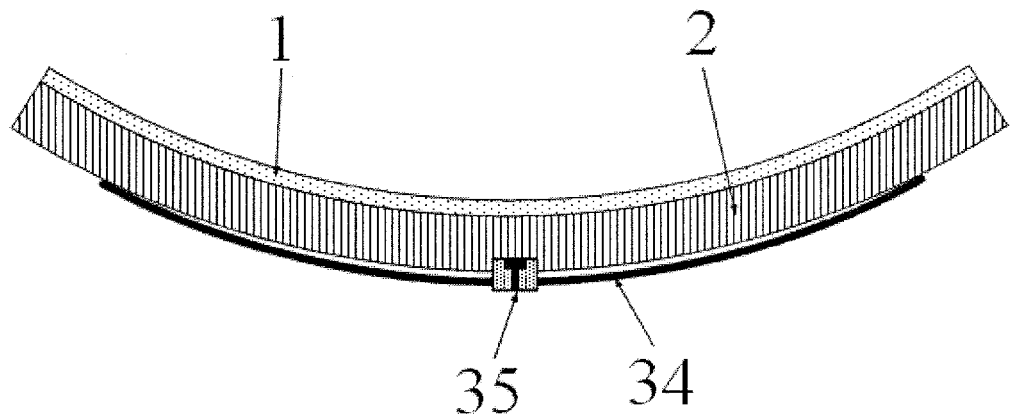
FIG. 3 is still another structural schematic diagram of a display apparatus of an embodiment of the present disclosure.

As shown in FIG. 3, for example, the actuating structure 3 is a curved strip structure, the actuating structure 3 is movably connected with the supporting backplate 2, the actuating structure 3 can rotate with respect to the supporting backplate 2, and when rotating, the actuating structure 3 has difference positions respectively in squeezed contact with the supporting backplate 2.

As shown in FIG. 3, for example, the display apparatus further includes a driving structure 35, the driving structure 35 is respectively connected with a center of the actuating structure 3 and connected with the supporting backplate 2, and the driving structure 35 can drive the actuating structure 3 to rotate with respect to the supporting backplate 2.

Figure 4:
FIG. 4 is a structural schematic diagram of an actuating structure of an embodiment of the present disclosure.
Figure 5:
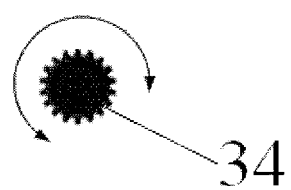
FIG. 5 is a sectional schematic diagram of an actuating structure of an embodiment of the present disclosure.

For example, as shown in FIG. 4 and FIG. 5, in the embodiment of the present disclosure, the actuating structure 3 is provided as the curved strip structure, the actuating structure 3 is connected to one side of the supporting backplate 2 opposite to the display panel 1, and one position of the actuating structure 3 can be movably connected with the supporting backplate 2, so that the actuating structure 3 can axially rotate with respect to the supporting backplate 2, i.e., the actuating structure 3 can rotate with a tangent line of the supporting backplate 2 as a rotating axis; and thus, due to the bent shape of the actuating structure 3, distances from different positions of the actuating structure 3 to a corresponding position of the supporting backplate 2 are different, i.e., when the actuating structure 3 rotates, radii of circular traces formed by rotation of different positions of the actuating structure 3 are different; by rotating the actuating structure 3, different positions of the actuating structure 3 can be respectively in contact with the supporting backplate 2 and a squeezing effect is applied, so that the supporting backplate 2 can be bent to different degrees; and if the supporting backplate 2 needs to be bent to a greater degree, positions of the actuating structure 3, of which the rotation traces have large radii, are in squeezed contact with the supporting backplate 2, and if the supporting backplate 2 needs to be bent to a smaller degree, positions of the actuating structure 3, of which the rotation traces have small radii, are in squeezed contact with the supporting backplate 2. The actuating structure 3 can be bent into different shapes; commonly, both ends of the actuating structure 3 have large bending degrees, and the rotation traces of both the ends of the actuating structure 3 have the maximum radius; and a middle part of the actuating structure 3 is bent less, and is rotationally connected with the supporting backplate 2 through parts, e.g., a bearing and the like.

Of course, the driving structure 35 also can be arranged on the actuating structure 3 so as to drive the actuating structures 3 to rotate, for example, a motor can be adopted to drive a gear or a belt and the like so as to drive the actuating structure 3 to rotate, and a rotating angle can be fixed for example.

As shown in FIG. 3 and FIG. 4, for example, the actuating structure 3 is an arc curved bar 34, and the curved bar 34 can rotate along an axial direction.

As shown in FIG. 3 and FIG. 4, for example, a rotation radius on both ends of the curved bar 34 is greater than the distance from a center of the curved bar to the supporting backplate 2.

For example, in the embodiment of the present disclosure, the actuating structure 3 is provided as the regular arc curved bar 34, and a middle part of the arc curved bar 34 is connected with the supporting backplate 2 by means of the driving structure 35. Both ends of the arc curved bar 34 have the maximum bending degree, and the rotation radius of both ends of the arc curved bar is greater than the distance from the center of the curved bar to the supporting backplate, or in the rotating process, both ends of the curved bar may possibly not be in contact with the supporting backplate 2. When the curved bar 34 rotates, both ends of the curved bar 34 can be in contact with both sides of the supporting backplate 2, and push both sides of the supporting backplate 2 to bend inwards, i.e., the bending degree is improved, and the curvature is reduced. When both ends of the curved bar 34 rotate away from the supporting backplate 2, due to resilience of the supporting backplate 2, the bending degree is reduced, and the curvature is improved. The bending degree (inward bending amounts of both ends) of the supporting backplate 2 is between a preset value and a value of a sum of the preset value and the circular radius of the motion trace of an end part of the curved bar. For example, as shown in FIG. 10 to FIG. 13, the actuating structure 3 also can adopt a curved bar which is of any other shape, e.g., both ends of the curved bar are of a bent shape, or both ends of the curved bar are of a bent hook shape or a V shape or the like, multiple positions on the actuating structure 3 also can be bent integrally and the actuating structure 3 is flexibly set according to practical situations.

For example, as shown in FIG. 1, the display apparatus further includes a buffer member 4, and the buffer piece 4 is arranged between the actuating structure 3 and the supporting backplate 2. In order to prevent the part of the actuating structure 3 contacting with the supporting backplate 2 from being too hard to cause damage to the supporting backplate 2, the buffer member 4, e.g., a gasket made of the material of rubber, foam, plastics or the like which has buffering function, or a sleeve or the like, can be arranged at a position where the actuating structure 3 is in contact with the supporting backplate 2.

As shown in FIG. 6 to FIG. 9, for example, a plurality of actuating structures 3 are arranged, and the plurality of actuating structures 3 can be sequentially arranged in a random direction. The number of the actuating structures 3 can be flexibly set according to actual demands, and the actuating structures 3 can be arranged on the supporting backplate 2 in a random direction, thereby facilitating respectively driving different positions of the supporting backplate 2 along different directions.

Figure 6:
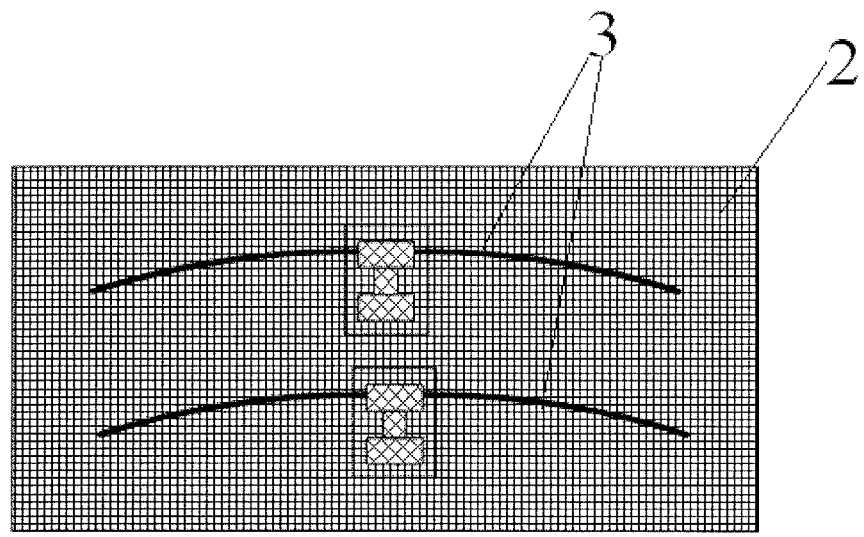
FIG. 6 is another structural schematic diagram of a display apparatus of an embodiment of the present disclosure.
Figure 7:
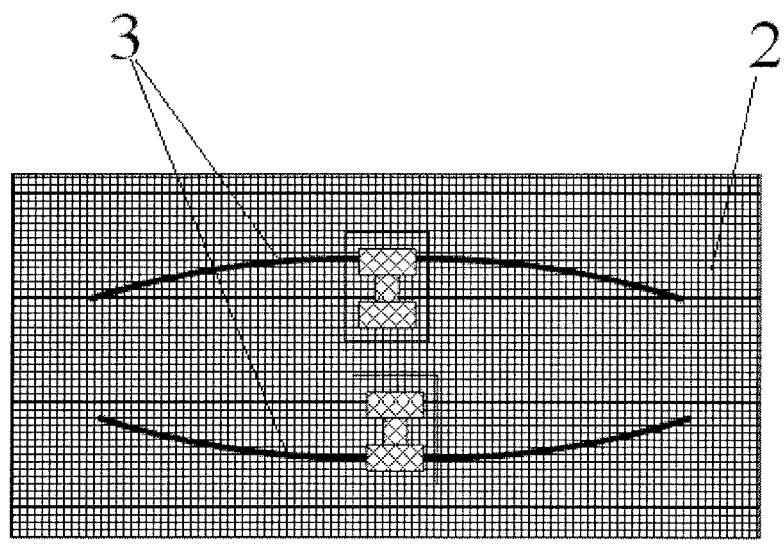
FIG. 7 is still another structural schematic diagram of a display apparatus of an embodiment of the present disclosure.
Figure 8:
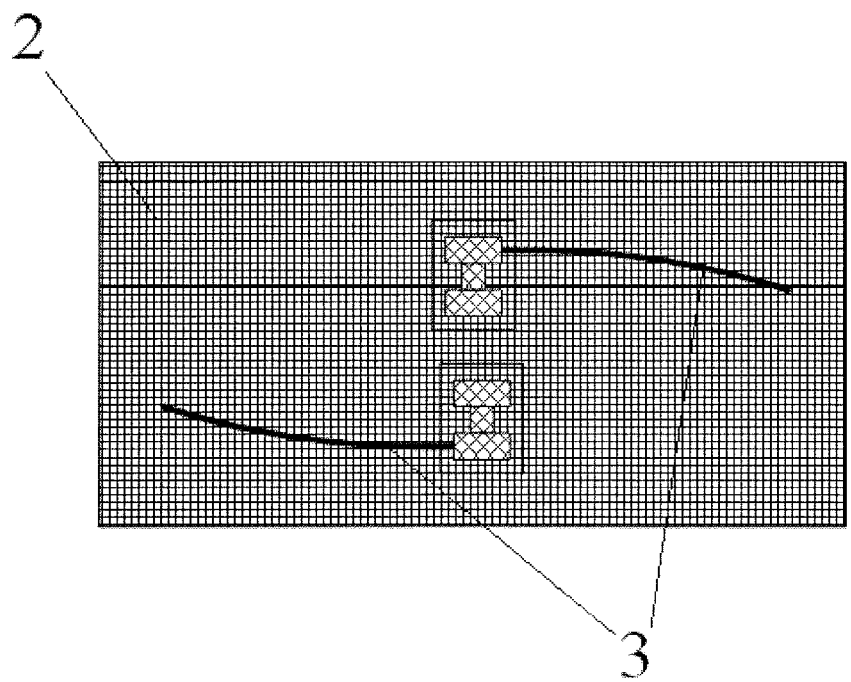
FIG. 8 is yet another structural schematic diagram of a display apparatus of an embodiment of the present disclosure.
Figure 9:
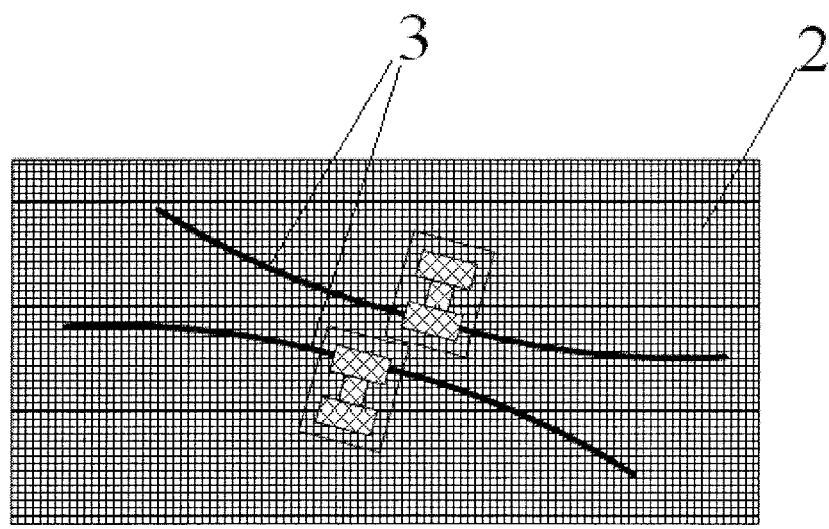
FIG. 9 is yet another structural schematic diagram of a display apparatus of an embodiment of the present disclosure.
Figure 10:
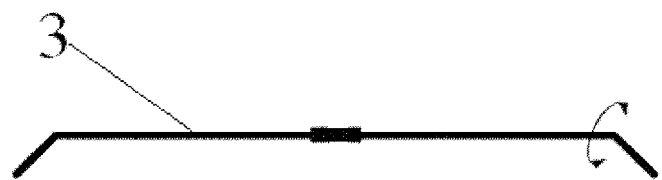
FIG. 10 is another structural schematic diagram of an actuating structure of an embodiment of the present disclosure.
Figure 11:
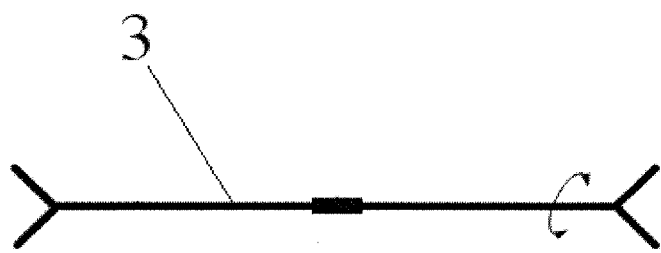
FIG. 11 is still another structural schematic diagram of an actuating structure of an embodiment of the present disclosure.
Figure 12:
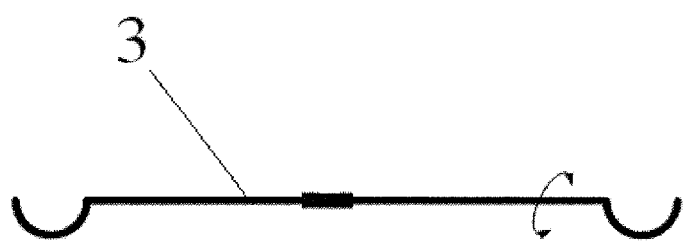
FIG. 12 is yet another structural schematic diagram of an actuating structure of an embodiment of the present disclosure.
Figure 13:
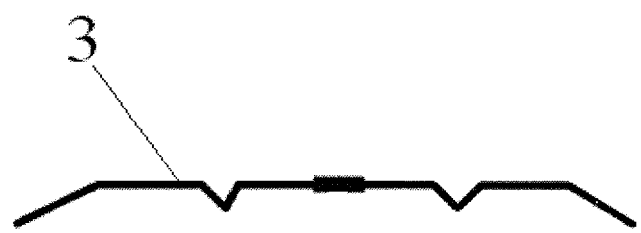
FIG. 13 is yet another structural schematic diagram of an actuating structure of an embodiment of the present disclosure.

For example, as shown in FIGS. 6-7, two actuating structures 3 are provided side by side on the supporting backplate 2, the extension direction of the two actuating structures 3 are parallel to the length direction of the backplate 2, and the bending direction of the two actuating structures 3 are the same as each other or different from each other. Alternatively, as shown in FIG. 8, each of the two actuating structures 3 includes one branch on either side thereof, and the two branches of the two actuating structures 3 extend to opposite sides. Alternatively, as shown in FIG. 9, the extension of the two actuating structures 3 is slant with respect to the length direction of the backplate 2.

In the embodiment of the present disclosure, for example, the supporting backplate 2 and the curved bar 34 can adopt a material of glass, metal, carbon fiber, organic glass, ceramics or the like.

An embodiment of the present disclosure further provides a display device, the display device including the display apparatus described above.

The foregoing embodiments merely are exemplary embodiments of the disclosure, and not intended to define the scope of the disclosure, and the scope of the disclosure is determined by the appended claims.

The present application claims priority of the Chinese Patent Application No. 201510659151.2 filed on Oct. 12, 2015, the disclosure of which are incorporated herein by its reference in its entirety as part of the present application.

What is claimed is:

1. A display apparatus, comprising a display panel, an elastic supporting backplate and at least one actuating structure, wherein
   the display panel is attached to the supporting backplate;
   the actuating structure is arranged on one side of the supporting backplate away from the display panel and are in contact with the supporting backplate; and
   the supporting backplate is capable of being driven by the actuating structure, so that bending degrees of the supporting backplate and the display panel can be changed,
   wherein the actuating structure is a strip shape airbag, and an inflation-deflation control unit is arranged on the strip shape airbag.

2. The display apparatus according to claim 1, wherein the actuating structure is an elastic structure, a shape of which is variable, and with elastic change of the shape of the actuating structure, the bending degrees of the supporting backplate and the display panel can be driven to change.

3. The display apparatus according to claim 1, wherein the strip shape airbag is arranged on an outer surface of the supporting backplate.

4. The display apparatus according to claim 1, wherein a pressure bearing groove is formed inside the supporting backplate, and the strip shape airbag is arranged in the pressure bearing groove.

5. The display apparatus according to claim 1, comprising a plurality of actuating structures.

6. A display device, comprising the display apparatus according to claim 1.

7. A display apparatus, comprising a display panel, an elastic supporting backplate and at least one actuating structure, wherein
   the display panel is attached to the supporting backplate;
   the actuating structure is arranged on one side of the supporting backplate away from the display panel and are in contact with the supporting backplate; and
   the supporting backplate is capable of being driven by the actuating structure, so that bending degrees of the supporting backplate and the display panel can be changed, wherein the actuating structure is a curved strip structure, the actuating structure is movably connected with the supporting backplate, the actuating structure is rotatable with respect to the supporting backplate, and when rotating, the actuating structure has different positions respectively in squeezed contact with the supporting backplate.

8. The display apparatus according to claim 7, further comprising a driving structure, wherein the driving structure is respectively connected with a center of the actuating structure and the supporting backplate, and the driving structure is capable of driving the actuating structure to rotate with respect to the supporting backplate.

9. The display apparatus according to claim 7, wherein the actuating structure is an arc curved bar, and the curved bar is rotatable along an axial direction.

10. The display apparatus according to claim 9, wherein a rotation radius on both ends of the curved bar is greater than a distance from a center of the curved bar to the supporting backplate.

11. A display device, comprising the display apparatus according to claim 7.

12. A display apparatus, comprising a display panel, an elastic supporting backplate and at least one actuating structure, wherein
the display panel is attached to the supporting backplate;
the actuating structure is arranged on one side of the supporting backplate away from the display panel and are in contact with the supporting backplate; and
the supporting backplate is capable of being driven by the actuating structure, so that bending degrees of the supporting backplate and the display panel can be changed, the display apparatus further comprising a buffer member, wherein the buffer member is arranged between the actuating structure and the supporting backplate.

13. A display device, comprising the display apparatus according to claim 12.

\* \* \* \* \*